(12) United States Patent
Ogawa et al.

(10) Patent No.: US 11,704,104 B2
(45) Date of Patent: Jul. 18, 2023

(54) CONTROL APPARATUS, CONTROL METHOD, AND COMPUTER PROGRAM

(71) Applicant: SUMITOMO ELECTRIC INDUSTRIES, LTD., Osaka (JP)

(72) Inventors: Akihiro Ogawa, Osaka (JP); Yoshihisa Nagamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 559 days.

(21) Appl. No.: 16/628,421

(22) PCT Filed: May 28, 2018

(86) PCT No.: PCT/JP2018/020284
§ 371 (c)(1),
(2) Date: Jan. 3, 2020

(87) PCT Pub. No.: WO2019/035261
PCT Pub. Date: Feb. 21, 2019

(65) Prior Publication Data
US 2020/0210167 A1 Jul. 2, 2020

(30) Foreign Application Priority Data
Aug. 16, 2017 (JP) .................. 2017-157196

(51) Int. Cl.
*G06F 8/65* (2018.01)
*B60R 16/023* (2006.01)
*H04L 67/12* (2022.01)
*H04L 67/00* (2022.01)

(52) U.S. Cl.
CPC .............. *G06F 8/65* (2013.01); *B60R 16/023* (2013.01); *H04L 67/12* (2013.01); *H04L 67/34* (2013.01)

(58) Field of Classification Search
CPC ......... G06F 8/65; B60R 16/023; H04L 67/12; H04L 67/34; H04L 41/082; H04L 12/28; H04L 12/46; H04L 45/22; Y02D 10/00; Y02D 30/70; H04W 40/08
See application file for complete search history.

(56) References Cited

U.S. PATENT DOCUMENTS

2005/0188073 A1   8/2005   Nakamichi et al.

FOREIGN PATENT DOCUMENTS

| JP | H08-116325 A | 5/1996 |
|----|--------------|--------|
| JP | 2014-113952 A | 6/2014 |
| JP | 2014113952 | * 6/2014 |
| JP | 2014146997 | * 8/2014 |

(Continued)

OTHER PUBLICATIONS

Koike Tomoaya, "communication equipment" (Year: 2016). English translation of JP2016144178.*

*Primary Examiner* — Kim T Nguyen
(74) *Attorney, Agent, or Firm* — Oliff PLC

(57) ABSTRACT

A control apparatus that includes an in-vehicle communication unit configured to communicate with an on-vehicle control device, a storage unit configured to store a plurality of types of communication paths from the in-vehicle communication unit to the on-vehicle control device, and a selection unit configured to select a transmission path for transmitting an update program to the on-vehicle control device, among the plurality of types of stored communication paths.

7 Claims, 7 Drawing Sheets

(56) References Cited

FOREIGN PATENT DOCUMENTS

| | | | |
|---|---|---|---|
| JP | 2015-37938 A | | 2/2015 |
| JP | 2016-144178 A | | 8/2016 |
| JP | 2016144178 A | * | 8/2016 |
| WO | 2004/073269 A1 | | 8/2004 |

* cited by examiner

CONTROL APPARATUS, CONTROL METHOD, AND COMPUTER PROGRAM

TECHNICAL FIELD

The present invention relates to a control apparatus, a control method, and a computer program.

This application claims priority on Japanese Patent Application No. 2017-157196 filed on Aug. 16, 2017, the entire contents of which are incorporated herein by reference.

BACKGROUND ART

For example, Patent Literature 1 discloses a technology (online update function) that downloads an update program through a network to update a program.

CITATION LIST

Patent Literature

PATENT LITERATURE 1: Japanese Laid-Open Patent Publication No. 2015-37938

SUMMARY OF INVENTION

According to an embodiment, a control apparatus according to the present disclosure includes an in-vehicle communication unit configured to communicate with an on-vehicle control device, a storage unit configured to store a plurality of types of communication paths from the in-vehicle communication unit to the on-vehicle control device, and a selection unit configured to select a transmission path for transmitting an update program to the on-vehicle control device, among the plurality of types of stored communication paths.

According to another embodiment, a control method according to the present disclosure is a control method for controlling transmission of an update program to an on-vehicle control device by a control apparatus that communicates with the on-vehicle control device through an in-vehicle communication line. The control apparatus includes an in-vehicle communication unit configured to communicate with the on-vehicle control device, and a storage unit configured to store a plurality of types of communication paths from the in-vehicle communication unit to the on-vehicle control device. The control method includes the step of selecting a transmission path for transmitting the update program to the on-vehicle control device, among the plurality of types of stored communication paths.

According to still another embodiment, a computer program according to the present disclosure is a computer program for causing a computer to function as a control apparatus configured to communicate with an on-vehicle control device through an in-vehicle communication line. The computer includes an in-vehicle communication unit configured to communicate with the on-vehicle control device, and a storage unit configured to store a plurality of types of communication paths from the in-vehicle communication unit to the on-vehicle control device. The computer program causes the computer to function as a selection unit configured to select a transmission path for transmitting an update program to the on-vehicle control device, among the plurality of types of stored communication paths.

DESCRIPTION OF EMBODIMENTS

Problems to be Solved by Disclosure

Figure 1:
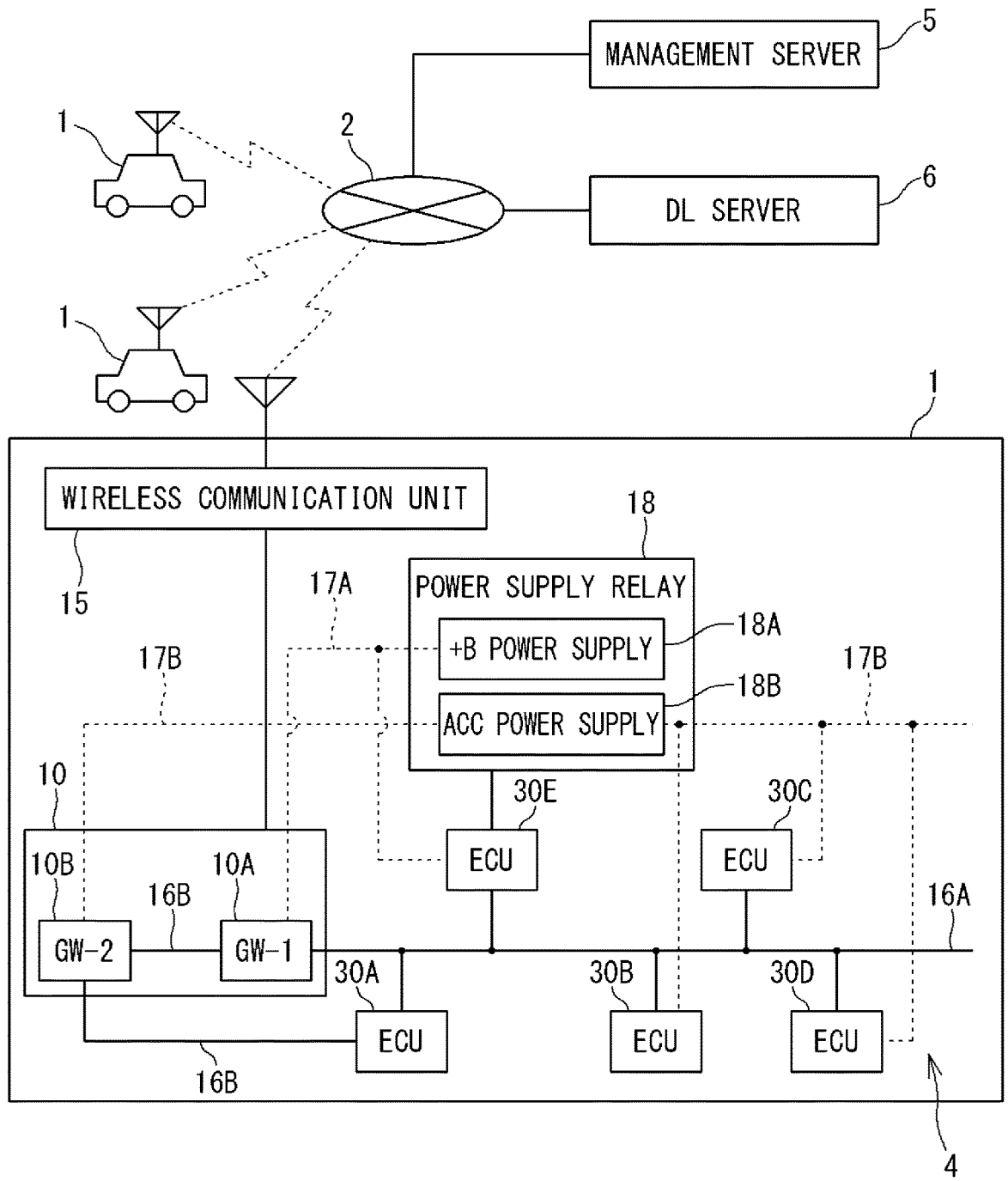
FIG. 1 is a diagram showing a configuration that includes an overall configuration of a program update system and a power supply configuration of a vehicle.

In the automotive field in recent years, vehicles have progressed in functionality, and a diverse range of on-vehicle devices are installed in vehicles. Accordingly, vehicles are equipped with large numbers of control devices, so-called ECUs (Electronic Control Units), for controlling these on-vehicle devices.

There are various types of ECUs such as: traveling-related ECUs that control an engine, a brake, an EPS (Electric Power Steering), etc., in response to operations on an accelerator, a brake, and a handle; body-related ECUs that control ON/OFF of interior lights and headlights, sound of an alarm unit, etc., in response to switch operations performed by an occupant; and meter-related ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions of control programs in response to version upgrading of control programs. Further, data required in executing the control program, such as map information and control parameters need to be overwritten.

The number of installed ECUs is increased along with progression of functionality of vehicles, and an in-vehicle network connecting the ECUs is complicated. Accordingly, a plurality of communication paths that can transmit an update program to an ECU updating a control program is present in some cases. In such a case, an appropriate path among the plurality of communication paths is preferably used as the transmission path of the update program.

An object in an aspect of the present disclosure is to provide a control apparatus, a control method, and a computer program that each can transmit an update program through an appropriate communication path in a case where a plurality of communication paths that can transmit the update program to a target on-vehicle control device is present.

Effects of Disclosure

According to the present disclosure, the update program can be transmitted through the appropriate communication path in the case where the plurality of communication paths that can transmit the update program to the target on-vehicle control device is present.

DESCRIPTION OF EMBODIMENTS

The present embodiment includes at least the following.

(1) A control apparatus included in the present embodiment includes an in-vehicle communication unit configured to communicate with an on-vehicle control device, a storage unit configured to store a plurality of types of communication paths from the in-vehicle communication unit to the on-vehicle control device, and a selection unit configured to select a transmission path for transmitting an update program to the on-vehicle control device, among the plurality of types of stored communication paths.

The transmission path transmitting the update program is selected based on an appropriately-set selection criterion from the plurality of types of communication paths from the control apparatus to the on-vehicle control device. This makes it possible to transmit the update program through the appropriate transmission path.

(2) Preferably, the selection unit calculates an index value for each of the plurality of types of communication paths, and selects the transmission path based on a result of comparison of the calculated index values.

Using the appropriate index value makes it possible to transmit the update program through the appropriate transmission path.

(3) Preferably, the index value includes electric energy consumed in transmission of the update program through the communication path, and the selection unit selects a communication path other than a communication path with a maximum electric energy, among the plurality of types of communication paths.

This makes it possible to reduce the electric energy consumption in transmission of the update program.

(4) Preferably, the index value includes a required time necessary for transmission of the update program through the communication path, and the selection unit selects a communication path other than a communication path with a maximum required time, among the plurality of types of communication paths.

This makes it possible to transmit the update program at high speed.

(5) Preferably, the index value includes electric energy consumed in transmission of the update program through the communication path and a required time necessary for transmission of the update program through the communication path, and the selection unit selects a communication path other than a communication path with a maximum required time among the plurality of types of communication paths in a case where a predetermined condition is satisfied, and selects a communication path other than a communication path with a maximum electric energy among the plurality of types of communication paths in a case where the predetermined condition is not satisfied.

Accordingly, the required time and the electric energy consumption of the index value are selectively usable depending on whether the predetermined condition is satisfied. As a result, the update program can be transmitted through the more appropriate transmission path depending on whether the above-described condition is satisfied.

(6) Preferably, the predetermined condition is that an urgency degree of update of a control program with use of the update program is high, and the urgency degree is set to the update program.

Accordingly, in the case of the update program with high urgency degree, the transmission path is selected based on the required time in preference to the electric energy consumption. As a result, the update program with high urgency degree is rapidly transmitted to the on-vehicle control device, and update of the control program can be rapidly executed.

(7) Preferably, the predetermined condition is that a battery supplying power to each of devices connected to the communication path is being charged.

Accordingly, when the battery is being charged, the transmission path is selected based on the required time in preference to the electric energy consumption. As a result, in a situation where power supply is not restricted, the update program is rapidly transmitted to the on-vehicle control device, and update of the control program can be rapidly executed.

(8) Preferably, the plurality of types of communication paths includes a communication path of a different communication system, the storage unit further stores a transmission rate of each of the communication paths, and the selection unit calculates the required time from the transmission rate and a size of the update program.

As a result, the required time as the index value can be obtained, and the transmission path can be selected using the index value.

(9) Preferably, the storage unit further stores power consumption in communication through each of the communication paths per unit time, and the selection unit multiplies the power consumption by the required time to calculate the electric energy.

As a result, the electric energy consumption as the index value can be obtained, and the transmission path can be selected using the index value.

(10) Preferably, the control apparatus further includes a control unit configured to control the in-vehicle communication unit, the storage unit further stores a communication path from another control apparatus to the on-vehicle control device, the selection unit selects the transmission path from the stored communication paths from the in-vehicle communication unit or the other control apparatus to the on-vehicle control device, and the control unit causes the in-vehicle communication unit to transmit an instruction of transmission of the update program to the on-vehicle control device to the other control apparatus in a case where the selected transmission path is the communication path from the other control apparatus to the on-vehicle control device.

In a case where each of a plurality of control apparatuses installed in a vehicle can transmit the update program to the on-vehicle control device, the transmission path is selected among the communication paths from the respective control apparatuses to the on-vehicle control device. This makes it possible to transmit the update program to the on-vehicle control device through more appropriate transmission path.

(11) A control method included in the present embodiment is a method for controlling transmission of an update program to an on-vehicle control device by the control apparatus according to any one of (1) to (10).

Such a control method achieves effects similar to the effects by the control apparatus according to (1) to (10) described above.

(12) A computer program included in the present embodiment causes a computer to function as the control apparatus according to any one of (1) to (10).

Such a computer program achieves effects similar to the effects by the control apparatus according to (1) to (10) described above.

DETAILED DESCRIPTION OF EMBODIMENTS

Some preferred embodiments are described below with reference to drawings. In the following description, the same parts and components are denoted by the same reference numerals. The same parts and components have the same names and functions. Accordingly, description of the parts and components is not repeated.

First Embodiment

[Overall Configuration of System]

FIG. 1 is a diagram showing a configuration that includes an overall configuration of a program update system and a power supply configuration of a vehicle 1 according to an embodiment of the present invention.

As shown in FIG. 1, the program update system of this embodiment includes vehicles 1, a management server 5, and a DL (download) server 6 that are able to communicate with each other via a wide-area communication network 2.

The management server 5 manages update information on the vehicles 1. The DL server 6 stores an update program. The management server 5 and the DL server 6 are operated by, for example, the automobile manufacturer of the vehicles 1, and are able to communicate with large numbers of vehicles 1 owned by users registered as members in advance.

Each vehicle 1 is equipped with an in-vehicle network (communication network) 4 that includes a plurality of ECUs 30A to 30D (representatively referred to as ECUs 30) and a gateway 10 connected via in-vehicle communication lines, a wireless communication unit 15, various kinds of on-vehicle devices (not shown) controlled by the respective ECUs 30, and a power supply that supplies power to each of the ECUs 30.

The gateway 10 includes a plurality of gateways including a first gateway (GW-1) 10A and a second gateway (GW-2) 10B, and one or the plurality of ECUs 30 is connected to each of the gateways. In other words, the ECUs 30A to 30E are connected to the gateway 10A through an in-vehicle communication line 16A, and the gateway 10B is connected to the gateway 10A through an in-vehicle communication line 16B. The ECU 30A is connected to the gateway 10B through the in-vehicle communication line 16B, and the gateway 10A is connected to the gateway 10B through the in-vehicle communication line 16B. Further, the ECUs 30B to 30E are connected to one another through the in-vehicle communication line 16A via the ECU 30A. The in-vehicle communication line 16A and the in-vehicle communication line 16B are also collectively referred to as in-vehicle communication lines 16.

The power supply includes a regular power supply (+B power supply) 18A and an accessary power supply (ACC power supply) 18B. The regular power supply 18A is connected to the gateway 10A and the ECU 30E through a power line 17A, and constantly supplies power to the gateway 10A and the ECU 30E. The accessary power supply 18B is connected to the gateway 10B and the ECUs 30B to 30D through a power line 17B, and supplies power to the gateway 10B and the ECUs 30B to 30D. ON/OFF of the accessary power supply 18B is switched by a power supply relay 18. The ECU 30E is a relay control ECU, and controls operation of the power supply relay 18 to control ON/OFF of the accessary power supply 18B.

As an example, the in-vehicle communication line 16A and the in-vehicle communication line 16B are different in communication standard. The communication (first communication) through the in-vehicle communication line 16A is communication conforming to a standard such as CAN (Controller Area Network) (also referred to as CAN communication). Accordingly, the gateway 10A and the ECUs 30A to 30E can perform mutual CAN communication. The communication (second communication) through the in-vehicle communication line 16B is communication conforming to a standard such as Ethernet (registered trademark). Accordingly, the gateway 10B can perform Ethernet communication with the gateway 10A and the ECU 30A, and functions as an Ethernet switch that switches the communication between the communication of the gateway 10A and the ECU 30A through the gateway 10B and the communication of the gateway 10B and the ECU 30A.

Note that the standards of the first communication and the second communication is not respectively limited to CAN and Ethernet, and may be the other standard such as CANFD (CAN with Flexible Data Rate), LIN (Local Interconnect Network), and MOST (Media Oriented Systems Transport: MOST is registered trademark). In the system according to the first embodiment, the gateway 10A can perform the plurality of types of communication including the first communication and the second communication, and the second communication is higher in communication speed (transmission rate) than the first communication.

The wireless communication unit 15 is communicably connected to the wide-area communication network 2 such as a mobile phone network, and is connected to the gateway 10 via an in-vehicle communication line. The gateway 10 transmits information received by the wireless communication unit 15 from external devices such as the management server 5 and the DL server 6 through the wide-area communication network 2, to the ECUs 30 through the in-vehicle communication lines 16.

The gateway 10 transmits information obtained from the ECUs 30 to the wireless communication unit 15, and the wireless communication unit 15 transmits the information to the external devices such as the management server 5.

Further, the ECUs 30 transmit and receive information through the in-vehicle communication lines with one another.

As for the wireless communication unit 15 installed in the vehicle 1, a device possessed by the user, such as a mobile phone, a smart phone, a tablet-type terminal, and a notebook PC (Personal Computer) is conceivable, in addition to an on-vehicle dedicated communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program update system shown in FIG. 1, the management server 5 and the DL server 6 are configured as separate servers. However, these serves 5 and 6 may be configured as a single server unit. Further, each of the management server 5 and the DL server 6 may include a plurality of units.

[Internal Configuration of Gateway]

Figure 2:
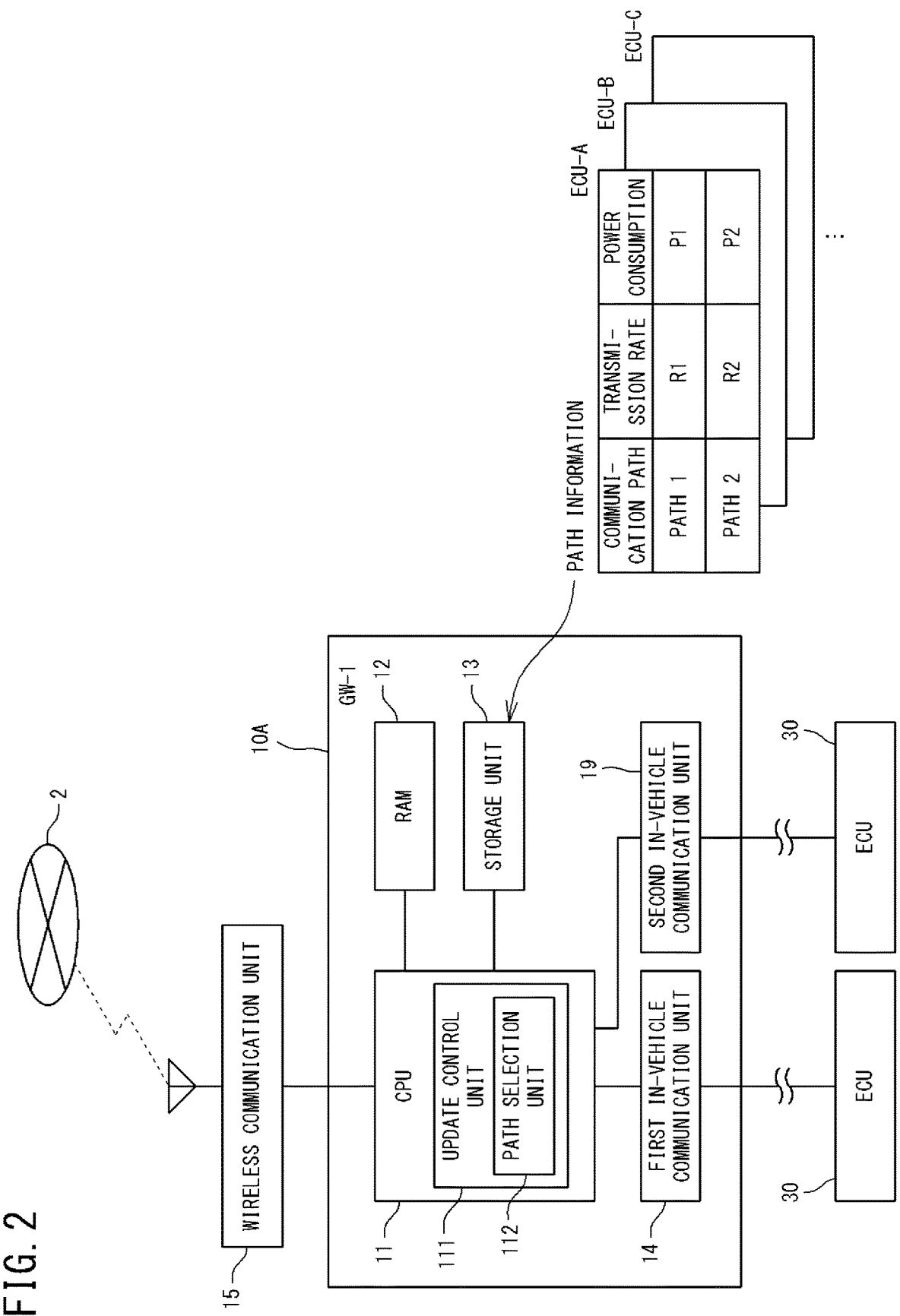
FIG. 2 is a block diagram showing an internal configuration of a first gateway.

FIG. 2 is a block diagram showing the internal configuration of the gateway 10A.

As shown in FIG. 2, the gateway 10A includes a CPU 11, a RAM (Random Access Memory) 12, a storage unit 13, a first in-vehicle communication unit 14, a second in-vehicle communication unit 19, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the plurality of programs in a time sharing manner, for example. Note that the CPU 11 may be a representative of a plurality of CPU groups. In this case, the function implemented by the CPU 11 is implemented by the plurality of CPU groups in cooperation with one another. The RAM 12 consists of a memory element such as an SRAM (Static RAM) or a DRAM (Dynamic RAM), and temporarily stores therein programs to be executed by the CPU 11, data required in executing the programs, and the like.

A computer program to be executed by the CPU 11 can be transferred in a state of being recorded in a well-known recording medium such as a CD-ROM and a DVD-ROM, or may be transferred by data transmission from a computer device such as a server computer.

In this regard, the same applies to a computer program to be executed by a CPU 31 of the ECU 30 (refer to FIG. 3) described below, and a computer program to be executed by a CPU 51 of the management server 5 (refer to FIG. 4) described below.

Note that, in the following description, data transfer (transmission) from a high-order device to a low-order device is also referred to as "downloading".

The storage unit 13 consists of, for example, a nonvolatile memory element such as a flash memory or an EEPROM. The storage unit 13 stores programs to be executed by the CPU 11, data required in executing the programs, and the like. The storage unit 13 further stores therein update programs of the respective ECUs 30 to be downloaded that are received from the DL server 6.

The first in-vehicle communication unit 14 performs, through the in-vehicle communication line 16A, the first communication with the other device connected through the in-vehicle communication line 16A. The second in-vehicle communication unit 19 performs, through the in-vehicle communication line 16B, the second communication with the other device connected through the in-vehicle communication line 16B.

The first in-vehicle communication unit 14 and the second in-vehicle communication unit 19 transmit information provided from the CPU 11 to the other devices such as a target ECU 30, and provide information received from the ECUs 30 to the CPU 11.

The wireless communication unit 15 consists of a wireless communication apparatus including an antenna and a communication circuit that executes transmission/reception of radio signals through the antenna. The wireless communication unit 15 is able to communicate with the external devices when connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that serves as a relay device inside the vehicle 1 may be adopted. The wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 are able to communicate with each other through a communication path consisting of the external device, the other communication device, the wired communication unit, and the gateway 10, in this order.

[Internal Configuration of ECU]

Figure 3:
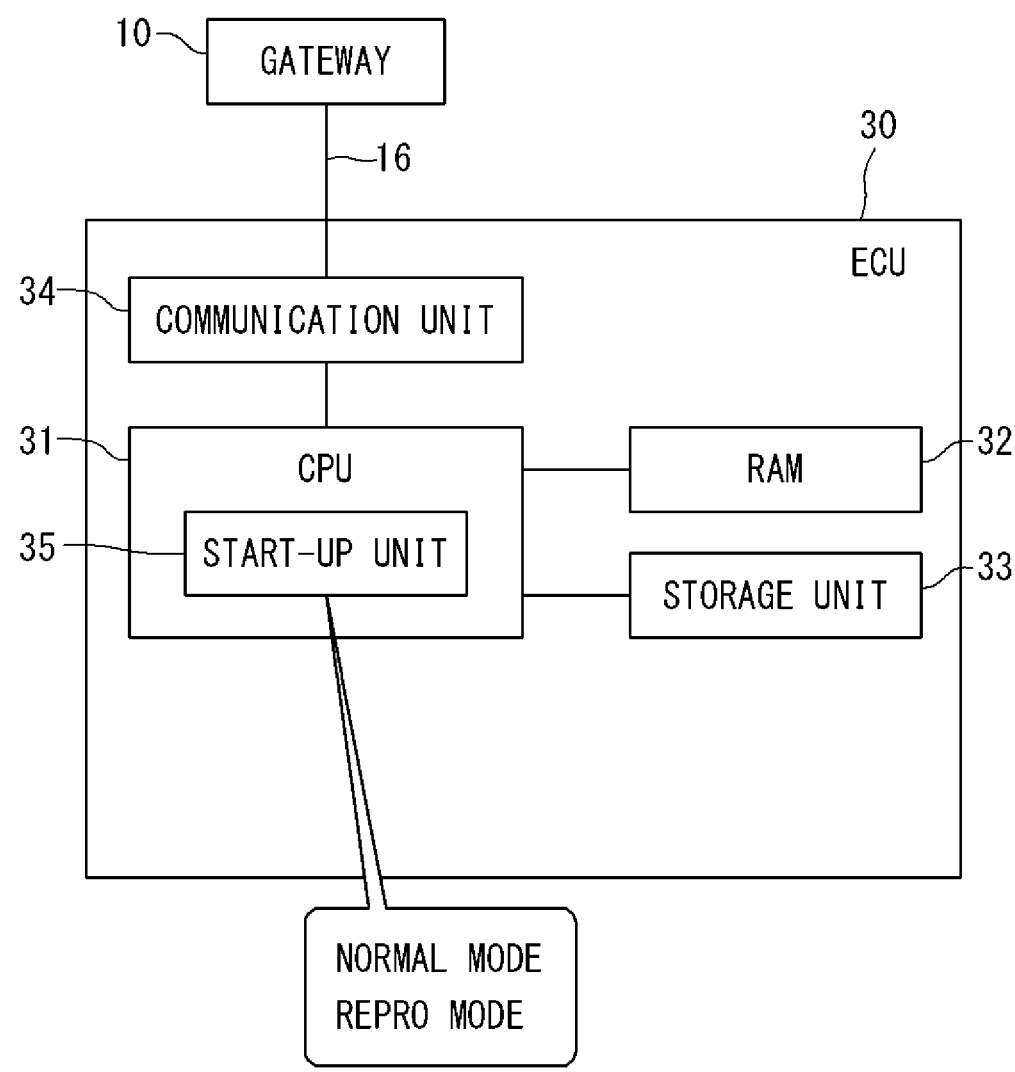
FIG. 3 is a block diagram showing an internal configuration of an ECU.

FIG. 3 is a block diagram showing the internal configuration of an ECU 30.

As shown in FIG. 3, the ECU 30 includes the CPU 31, a RAM 32, a storage unit 33, a communication unit 34, and the like. The ECU 30 is an on-vehicle control device that individually controls a target device installed in the vehicle 1. Examples of the types of the ECU 30 include a power-supply control ECU, an engine control ECU, a steering control ECU, and a door lock control ECU.

The CPU 31 controls the operation of a target device that the CPU 31 is in charge of, by reading out one or a plurality of programs previously stored in the storage unit 33 to the RAM 32 and executing the read programs. The CPU 31 may also be a representative of a plurality of CPU groups, and the control by the CPU 31 may be control by the plurality of CPU groups in cooperation with one another.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores programs to be read and executed by the CPU 31. Information stored in the storage unit 33 includes, for example, a computer program that causes the CPU 31 to execute information processing for controlling a target device to be controlled, inside the vehicle, and a control program that is data to be used to execute the program, such as parameters and map information.

The gateway 10 is connected to the communication unit 34 via the in-vehicle communication line arranged in the vehicle 1. The communication unit 34 communicates with the gateway 10 in accordance with a standard such as CAN, Ethernet, or MOST.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode" (hereinafter also referred to as "repro mode").

The normal mode is a control mode in which the CPU 31 of the ECU 30 executes original control for the target device (e.g., engine control for fuel engine, or door lock control for door lock motor).

The reprogramming mode is a control mode in which the CPU 31 updates the control program used for controlling the target device.

In other words, the reprogramming mode is a control mode in which the CPU 31 performs erasing/overwriting of the data of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on the storage area where the new version of the control program has been written.

After completion of the verifying process, the start-up unit 35 operates the CPU 31 with the updated control program.

Update of the control program with use of an update program downloaded from the DL server 6 to the ECU 30 through the gateway 10, is also referred to as online update.

[Internal Configuration of Management Server]

Figure 4:
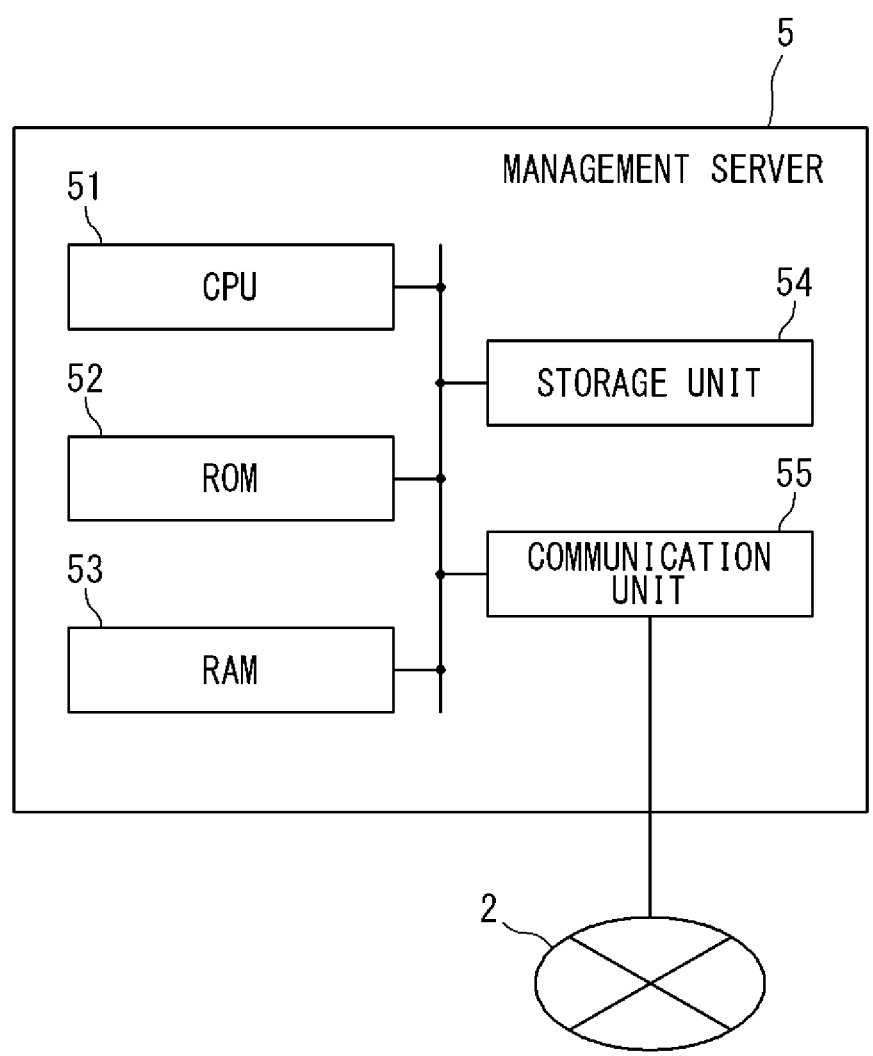
FIG. 4 is a block diagram showing an internal configuration of a management server.

FIG. 4 is a block diagram showing the internal configuration of the management server 5.

As shown in FIG. 4, the management server 5 includes the CPU 51, a ROM 52, a RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is able to communicate with the gateway 10. The CPU 51 may also be a representative of a plurality of CPU groups, and the function implemented by the CPU 51 may be implemented by the plurality of CPU groups in cooperation with one another.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Update Sequence]

Figure 5:
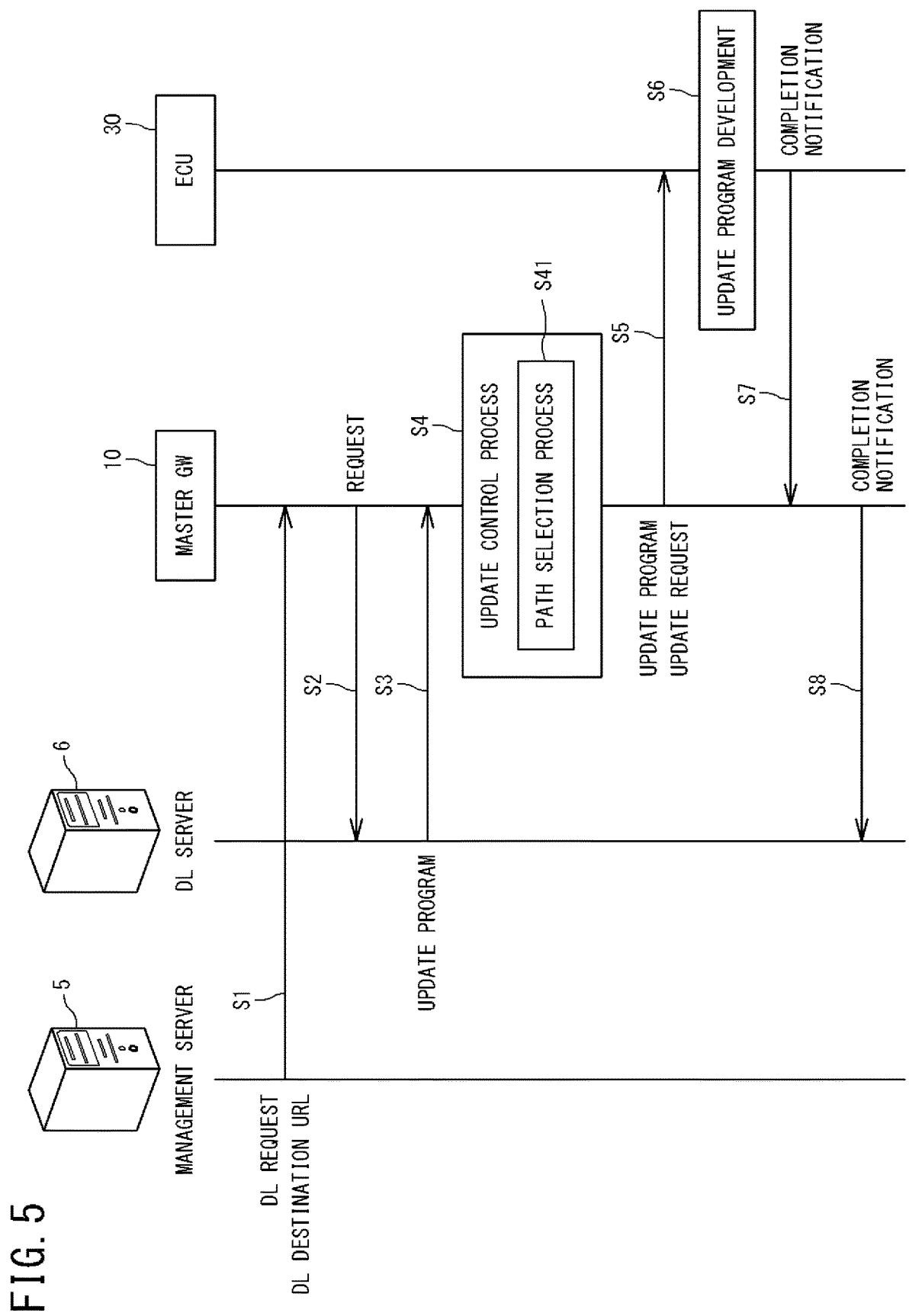
FIG. 5 is a sequence diagram showing an example of flow of online update of a control program, executed by the program update system.

FIG. 5 is a sequence diagram showing an example of flow of control program online update executed in the program update system of the present embodiment. One or a plurality of update programs is stored in the DL server 6. As an example, the management server 5 determines timing when the control programs for the ECUs of a previously-registered vehicle 1 are updated. The update timing may be set by, for example, the automobile manufacturer of the vehicle 1. In the program update system according to the present embodiment, one (for example, gateway 10A) of the plurality of gateways 10A and 10B functions as a relay device that relays an update program in online update. In the following description, the gateway functioning as the relay device is also referred to as a master gateway (master GW).

The control program includes not only the program itself but also data used in execution of the program, such as the parameters and the map information. The representative thereof is represented as the "control program". Accordingly, the update program includes not only the program for updating the program but also data for updating the data used in execution of the program.

When the control program update timing arrives, the management server 5 notifies the master GW 10 of the corresponding vehicle 1 of update (step S1). In step S1, a download request and update information including destination URL where the update program is stored and a size of the update program are transmitted from the management server 5 to the master GW 10.

Upon receiving the update notification from the management server 5, the master GW 10 relays the update program downloaded from the DL server 6, to the ECU 30 (hereinafter, target ECU) in which the control program is updated. In other words, the master GW 10 requests download of the update program to the DL server 6 based on the update information (step S2).

Upon receiving the download request from the master GW 10, the DL server 6 transmits the update program to be downloaded to the master GW 10, and requests update of the control program (step S3).

Upon downloading the update program, the master GW 10 executes an update control process (step S4). The update control process includes a path selection process (step S41) that is a process to select a path for transmitting the update program to the target ECU 30. The master GW 10 transfers the update program to the target ECU based on a result of the update control process, and requests the target ECU to update the control program (step S5). The master GW 10 may transfer the update program by receiving update permission from the user.

Upon receiving the update program, the target ECU develops the update program in response to the request from the master GW 10, and updates the control program (step S6). Upon completing update of the control program, the target ECU notifies the master GW 10 of update completion (step S7). Upon receiving the notification, the master GW 10 notifies the DL server 6 of update completion (step S8).

[Functional Configuration of Gateway]

As shown in FIG. 2, the CPU 11 of the gateway 10 functioning as the master GW includes an update control unit 111 for a function to execute the update control process. The update control unit 111 includes a path selection unit 112 that executes the path selection process. These functions are achieved by the CPU 11 when the CPU 11 reads out and executes one or a plurality of programs stored in the storage unit 13. However, at least a part of the functions may be achieved by hardware such as an electronic circuit.

The storage unit 13 previously stores path information relating to a path from the master GW for each ECU to become the target ECU, for execution of the path selection process by the path selection unit 112. In a case where the target ECU is the ECU 30A in FIG. 1, there are the following two paths 1 and 2 as candidates of a transmission path (hereinafter, also referred to as candidate path) for the update program from the gateway 10A as the master GW to the target ECU. The path information from the gateway 10A to the target ECU includes information specifying the following paths 1 and 2.

Path 1: gateway 10A to ECU 30A

Path 2: gateway 10A to ECU 30A through gateway 10B

When the path information is prepared for each of the ECUs, it is possible to confirm whether a plurality of candidate paths for the update program to the target ECU is present, by referring to the path information.

In a case where the plurality of candidate paths is present, the function represented by the path selection unit 112 (hereinafter, path selection unit 112) selects a transmission path from the plurality of candidate paths. The path selection unit 112 selects the transmission path with use of one or more index values. In other words, the path selection unit 112 calculates the index values for each of the candidate paths, and selects the transmission path based on a result of comparison of the calculated index values.

One of the indices is, for example, a time (transfer required time) necessary for transferring the update program (first index). To calculate the index value, the path information includes information indicating a transmission speed (transmission rate) of each of the paths. The path selection unit 112 multiplies a reciprocal of the transmission rate of each of the paths 1 and 2 by a size of the update program to calculate the transfer required time T of each of the paths 1 and 2. As an example, the path selection unit 112 selects a path with the transfer required time T shorter than the maximum transfer required time T, among the plurality of candidate paths.

The path with the transfer required time T shorter than the maximum transfer required time T is preferably a path with the minimum transfer required time T among the plurality of candidate paths. However, the path with the transfer required time T shorter than the maximum transfer required time T is not limited to the path with the minimum transfer required time T, and may be a path with the transfer required time T larger than the minimum transfer required time T as long as the transfer required time T is shorter than the maximum transfer required time T. For example, in a case where there are three candidate paths, a path with the minimum transfer required time T or a path with the second minimum transfer required time T may be selected. In this regard, the same applies to a path with electric energy consumption P·T smaller than the maximum electric energy consumption P·T described below.

Further, one of the indices is, for example, electric energy (electric energy consumption) consumed by transfer of the update program (second index). To calculate the index value, the path information includes information indicating power consumption P for each of the paths during communication. The path selection unit 112 multiplies the power consumption P of each of the paths 1 and 2 by the transfer required time T of each of the paths 1 and 2, to calculate the electric energy consumption P·T of each of the paths 1 and 2. As an example, the path selection unit 112 selects a path with the electric energy consumption P·T smaller than the maximum electric energy consumption P·T, among the plurality of candidate paths.

The power consumption P relates to, for example, the number of ECUs started up by communication of each of the paths. For example, the ACC power supply 18B that supplies power to the gateway 10B included in the path 2 starts up the ECUs 30B, 30C, and 30D that are not the target ECU. Therefore, the power consumption P of the path 2 includes power consumption for starting up the ECUs 30B, 30C and 30D. Accordingly, the information indicating the power consumption P included in the path information may be the number of ECUs started up by the communication of the path 2 in place of the power consumption P itself of the path 2. In this case, the power consumption P can be calculated by multiplying the number of the ECUs by previously-stored power consumption for starting up one ECU.

Note that, as another example, the power consumption P relates to power consumption of each of the gateways 10A and 10B. For example, even in a case where the number of ECUs started up by the communication of the path is the same number, the power consumption P of the path including one of the gateways 10 that is larger in power consumption than the other becomes large. In this case, the power consumption P can be calculated by multiplying the previously-stored power consumption of the gateway 10 by a prescribed coefficient.

In the case where the target ECU is the ECU 30A, namely, in a case where the candidate paths are the two paths 1 and 2, the transfer required time T of the path 2 is shorter than the transfer required time T of the path 1 because the transmission rate of the Ethernet communication is higher than the transmission rate of the CAN communication. Accordingly, in the case where the transmission path is selected based on the first index, the path selection unit 112 selects the path 2.

In contrast, the ACC power supply 18B that supplies power to the gateway 10B included in the path 2 also starts up the ECUs 30B, 30C, and 30D that are not the target ECU. Therefore, the power consumption of the path 2 is larger than the power consumption of the path 1. Further, in a case where the ACC power supply 18B is turned off, relay switching by the power supply relay 18 to turn on the ACC power supply 18B is necessary. Therefore, the power consumption of the path 2 is further larger than the power consumption of the path 1. Accordingly, in the case where the transmission path is selected based on the second index, the path selection unit 112 may not select the path 2 (selects path 1) depending on the electric energy consumption.

Preferably, the path selection unit 112 switches the index used to select the transmission path based on whether a predetermined condition is satisfied. For example, the predetermined condition is that charging is performed at selection of the transmission path. Alternatively, for example, the predetermined condition is that a remaining battery level at selection of the transmission path is larger than or equal to a threshold. In other words, in a case where the charging is performed at selection or in a case where the remaining battery level is larger than or equal to the threshold at selection, the path selection unit 112 selects the transmission path based on the first index (transfer required time). In this case, since sufficient power is suppliable from the battery, importance is placed on reduction of the required time until completion of the update. The path selection unit 112 can acquire whether the vehicle 1 is being charged or the remaining battery level by monitoring a frame transmitted from a battery control ECU (not shown).

Further, as another example, the predetermined condition is that an urgency degree of update of the control program with use of the update program is high. The urgency degree is set to the update program. In other words, in a case of the update program having the high urgency degree of update, the path selection unit 112 selects the transmission path based on the first index (transfer required time). This is because, also in this case, importance is placed on reduction of the required time until completion of the update more than the electric energy consumption. The urgency degree may be determined from information previously imparted to the update program, or based on a type of the update program. For example, in a case where the update program is map data, it can be determined that the urgency degree is low. In a case where the update program is a part of the control program, it can be determined that the urgency degree is high.

In a case where the above-described conditions are not satisfied, namely, in a case other than the above-described cases, the path selection unit 112 selects the transmission path based on the second index (electric energy consumption). In addition, the predetermined condition may further include that the vehicle 1 is traveling. In other words, in a case other than the above-described cases and the vehicle 1 is parked, the path selection unit 112 selects the transmission path based on the second index (electric energy consumption). This makes it possible to update the control program while suppressing power consumption. This is because, in a case where the online update is executed while the vehicle 1 is parked, large power consumption may make the remaining battery level lower than electric energy necessary for start-up of the vehicle 1, and accordingly, the vehicle 1 may become unable to travel.

The function represented by the update control unit 111 (hereinafter, update control unit 111) transmits the downloaded update program to the target ECU through the transmission path selected by the path selection unit 112. More specifically, the update control unit 111 passes the update program to the in-vehicle communication unit corresponding to the selected transmission path out of the first in-vehicle communication unit 14 and the second in-vehicle communication unit 19, and causes the in-vehicle communication unit to transmit the update program to the target ECU. Further, the update control unit 111 instructs the power supply relay 18 to turn on the ACC power supply 18B as necessary. More specifically, the update control unit 111 generates a frame that includes data instructing the relay control ECU 30E to turn on the ACC power supply 18B, and causes the first in-vehicle communication unit 14 to transmit the frame to the ECU 30E.

[Operation Flow]

Figure 6:
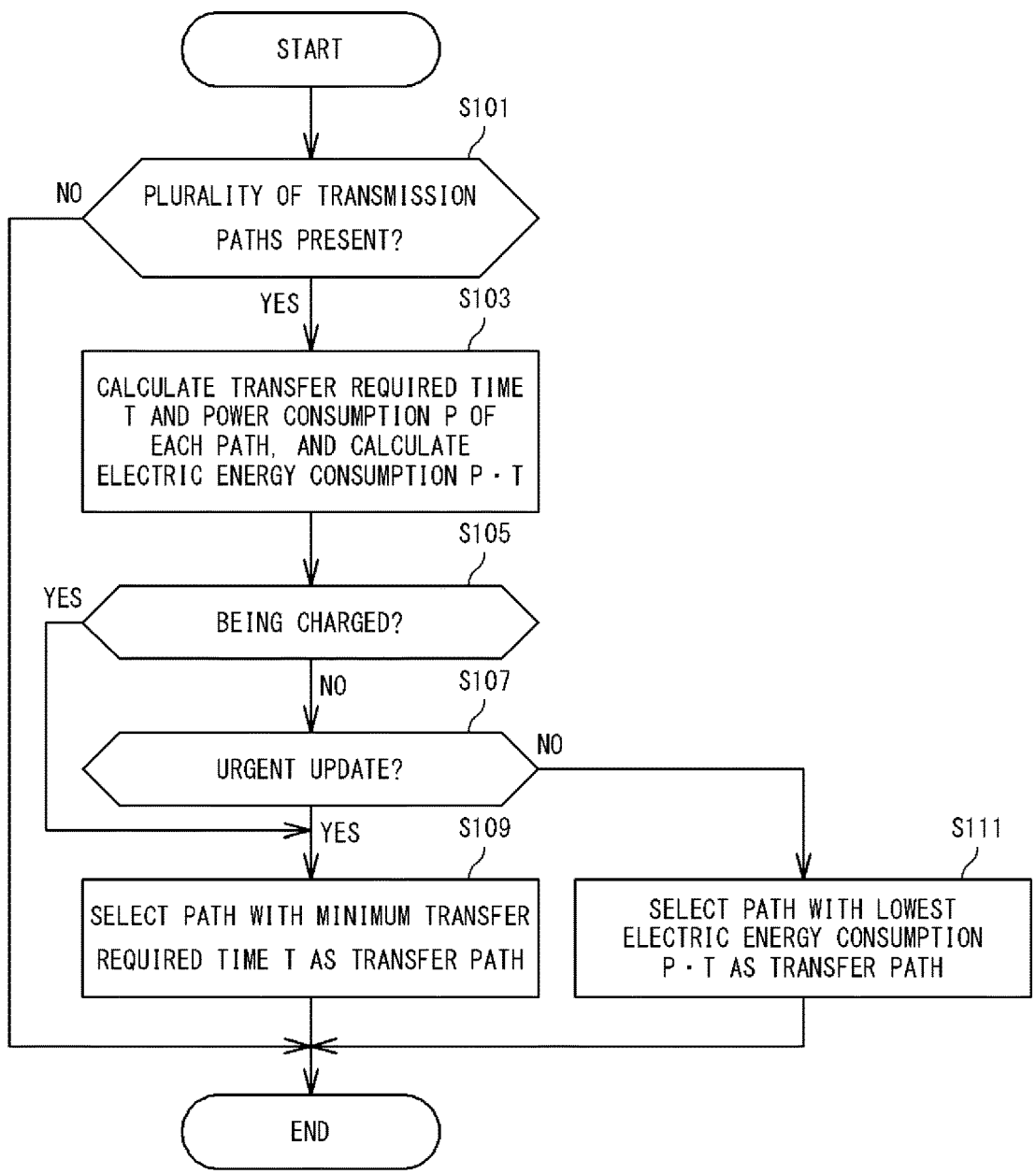
FIG. 6 is a flowchart showing specific flow of a path selection process included in an update control process in step S6 of FIG. 5, in a program update system according to a first embodiment.

FIG. 6 is a flowchart showing specific flow of the path selection process included in the update control process in step S6 of FIG. 5, in the program update system according to the first embodiment. Operation shown in the flowchart of FIG. 6 is started when the update program downloaded in step S3 of FIG. 5 is stored in the storage unit 13 of the master GW. The process shown in the flowchart of FIG. 6 is executed when the CPU 11 of the gateway 10 reads out one or a plurality of programs stored in the storage unit 13 to the RAM 12, and executes the read programs to achieve the functions shown in FIG. 2.

As shown in FIG. 6, the CPU 11 of the master GW first confirms whether a plurality of candidate paths for the transmission path to the target ECU of the target update program is present. In a case where the plurality of candidate paths is present (YES in step S101), the CPU 11 executes the path selection process according to the first embodiment.

In other words, the CPU 11 calculates the transfer required time T in each of the candidate paths. Further, the CPU 11 reads out the power consumption P from the path information or calculates the power consumption P with reference to the path information, and multiplies the transfer required time T by the power consumption P to calculate the electric energy consumption P·T for each of the candidate paths (step S103).

In a case where the vehicle 1 is being charged (YES in step S105), the CPU 11 selects, as the transmission path, the candidate path with the minimum transfer required time T among the plurality of candidate paths (step S109).

In a case where the vehicle 1 is not being charged and the update is high in urgency (NO in step S105 and YES in step S107), the CPU 11 selects, as the transmission path, the candidate path with the minimum transfer required time T among the plurality of candidate paths (step S109).

In a case other than the above-described cases (NO in step S105 and NO in step S107), preferably, further in a case where the vehicle 1 is parked, the CPU 11 selects, as the transmission path, the candidate path with the lowest electric energy consumption P·T among the plurality of candidate paths (step S111).

Effects of First Embodiment

The number of installed ECUs is increased along with progression of functionality of vehicles, and an in-vehicle network connecting the ECUs tends to be complicated. Accordingly, a plurality of paths that can transmit an update program to a target ECU is present in some cases. In such a case, when the path selection process according to the first embodiment is executed, the path with the lowest electric energy consumption in transmission of the update program among the plurality of paths (candidate paths) can be used as the transmission path for the update program. This makes it possible to reduce the electric energy consumption for update of the control program.

In the case where the online update is executed during stoppage of the vehicle 1, the update process is executed using the power supplied from the battery. If the power consumption at this time is increased and the remaining battery level is largely reduced, deficiency of power to start traveling of the vehicle 1 may occur. Therefore, in particular, in the case where the online update is executed while the vehicle 1 is parked, selection of the candidate path with the lowest electric energy consumption by the path selection process is effective to secure the power necessary for traveling of the vehicle 1.

Note that the candidate path with the minimum transfer required time is selected based on the condition at selection, namely, the candidate path is selected based on the transfer required time in preference to the electric energy consumption under the predetermined condition. For example, the predetermined condition is that the urgency degree of update is high or the vehicle 1 is being charged. Accordingly, under the above-described predetermined condition, it is possible to reduce the required time until completion of the update.

Second Embodiment

In a program update system according to a second embodiment, any of the plurality of gateways 10A and 10B can function as the master GW. In other words, any of the gateways 10 can transmit the update program to the target ECU from the relevant device.

Further, in the program update system according to the second embodiment, a master GW as the relay device for the update program can be switched between the plurality of gateways 10A and 10B. In other words, the gateway 10 as the master GW can select a transmission path in which the gateway 10 itself functions as the master GW, and also can select a transmission path in which the other gateway 10 functions as the master GW.

Accordingly, in a case where the other gateway 10 that can function as the master GW is present, the path selection unit 112 of the gateway 10 as the master GW according to the second embodiment selects, as the master GW, the gateway 10 functioning as the master GW of the candidate path that is selected using the above-described index among the candidate paths to the target ECU in the case where each of the gateways 10 functions as the master GW.

In a case where the selected gateway 10 is coincident with the current master GW, namely, in a case where the candidate path in which the gateway 10 functions as the master GW is selected, the update control unit 111 according to the second embodiment performs control similar to the control according to the first embodiment. In other words, the update control unit 111 performs control to transmit the update program through the transmission path selected by the path selection process.

In a case where the selected gateway 10 is a gateway 10 different from the current master GW, namely, in a case where the candidate path in which the other gateway 10 functions as the master GW is selected, the update control unit 111 according to the second embodiment performs control to switch the master GW. In other words, the update control unit 111 passes the update program to the selected gateway 10, and instructs the selected gateway 10 to function as the master GW. More specifically, the update control unit 111 generates a frame including instruction data, and causes the first in-vehicle communication unit 14 or the second in-vehicle communication unit 19 to transmit the frame. In this case, the gateway 10 receiving the instruction functions as the master GW and executes the path selection process in FIG. 6, and transmits the update program to the target ECU through the selected transmission path and requests the target ECU to perform update.

Alternatively, the update control unit 111 may pass the update program to the selected gateway 10, and may instruct the selected gateway 10 to function as the master GW and to transmit the update program through the transmission path selected by the path selection process. In this case, the gateway 10 receiving the instruction functions as the master GW, transmits the update program to the target ECU through the instructed transmission path without executing the path selection process in FIG. 6, and requests the target ECU to perform update.

Figure 7:
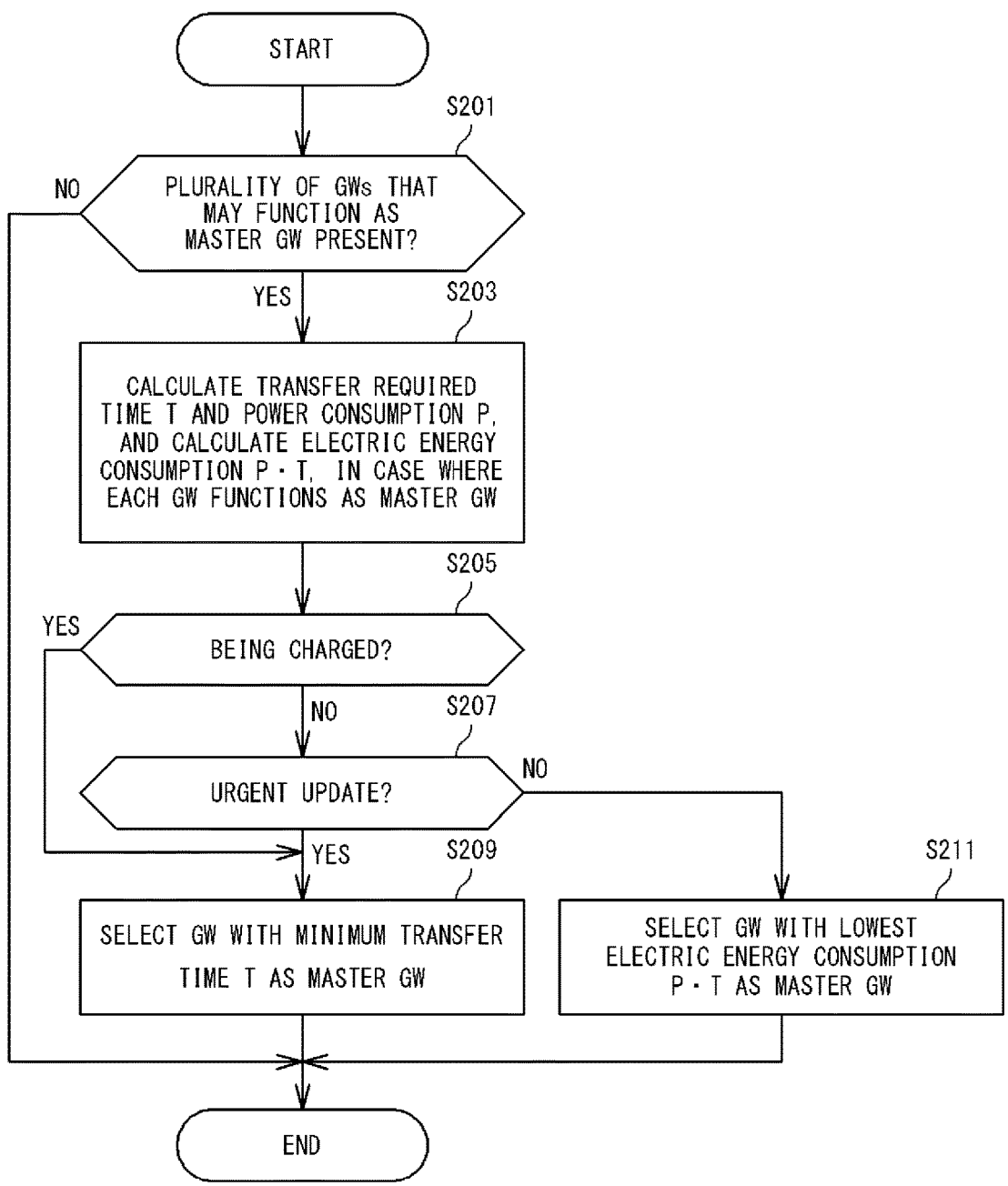
FIG. 7 is a flowchart showing specific flow of a path selection process included in an update control process in step S6 of FIG. 5, in a program update system according to a second embodiment.

FIG. 7 is a flowchart showing specific flow of the path selection process included in the update control process in step S6 of FIG. 5, in the program update system according to the second embodiment. The process shown in the flowchart of FIG. 7 is also executed when the CPU 11 of the gateway 10 reads out one or a plurality of programs stored in the storage unit 13 to the RAM 12, and executes the read programs to achieve the functions shown in FIG. 2.

As shown in FIG. 7, the CPU 11 of the master GW first confirms whether a plurality of gateways 10 that can function as the master GW is present in the in-vehicle network 4. In a case where the plurality of gateways 10 that can function as the master GW is present (YES in step S201), the CPU 11 executes the path selection process according to the second embodiment.

In other words, the CPU 11 calculates the transfer required time T in each of the candidate paths in a case where each of the gateways 10 functions as the master GW. Further, the CPU 11 reads out the power consumption P from the path information or calculates the power consumption P with reference to the path information, and multiplies the transfer required time T by the power consumption P to calculate the electric energy consumption P·T for each of the candidate paths (step S203).

At this time, the CPU may calculate an index value of each of the transfer required time T, the power consumption P, and the electric energy consumption P·T with use of the path information stored in each of the gateways 10. As another example, as for the candidate path in which the gateway 10 itself functions as the master GW, the CPU 11 may calculate these index values in a manner similar to the path selection process according to the first embodiment. As for the candidate path in which the other gateway 10 functions as the master GW, the CPU 11 may instruct the other gateway 10 to calculate the index values, and acquire the index values from the other gateway 10.

In a case where the vehicle 1 is being charged (YES in step S205), the CPU 11 selects, as the master GW, the gateway 10 functioning as the master GW of the candidate path with the minimum transfer required time T among the plurality of gateways 10 (step S209).

In a case where the vehicle 1 is not being charged and the update is high in urgency (NO in step S205 and YES in step S207), the CPU 11 selects, as the master GW, the gateway 10 functioning as the master GW of the candidate path with the minimum transfer required time T among the plurality of gateways 10 (step S209).

In a case other than the above-described cases (NO in step S205 and NO in step S207), preferably, further in a case where the vehicle 1 is parked, the CPU 11 selects, as the master GW, the gateway 10 functioning as the master GW of the candidate path with the lowest electric energy consumption P·T among the plurality of gateways 10 (step S211).

Effects of Second Embodiment

In the case where the plurality of gateways 10 is installed in the vehicle 1, there are a large number of paths that can transmit the update program from each of the plurality of gateways as the relay device to the target ECU. In this case, when the path selection process according to the second embodiment is executed, the path with the lowest electric energy consumption in transmission of the update program among the plurality of paths (candidate paths) each including the gateway as a transmission source can be used as the transmission path for the update program. This makes it possible to further reduce the electric energy consumption for update of the control program.

Third Embodiment

In the program update system according to each of the first embodiment and the second embodiment, the gateway 10A as the master GW can perform communication by the plurality of different types of communication systems. In other words, there are the plurality of types of communication paths different in communication system to the target ECU.

The plurality of types of communication paths from the gateway 10A as the master GW to the target ECU includes different paths of the same communication system. For example, in the example of FIG. 1, the above-described paths 1 and 2 may use the same communication system (for example, Ethernet communication). In this case, it is sufficient to provide one communication mechanism performing the in-vehicle communication, and the first in-vehicle communication unit 14 and the second in-vehicle communication unit 19 respectively indicate physical ports for the paths 1 and 2.

In a program update system according to the third embodiment, the transmission rate is the same between the paths 1 and 2 but the power consumption is different between the paths 1 and 2. Accordingly, when the path selection process is executed as with the program update system according to each of the first and second embodiments, the appropriate transmission path is selected based on the electric energy consumption.

The disclosed features are achieved by one or more modules. For example, the features can be achieved by a circuit element and other hardware module, by a software module specifying process achieving the features, or by a combination of the hardware module and the software module.

A program as a combination of one or more software modules to cause a computer to execute the above-described operation can also be provided. Such a program can be recorded in a computer-readable recording medium such as a flexible disk, a CD-ROM (Compact Disk-Read Only Memory), a ROM, a RAM, and a memory card attached to a computer, and provided as a program product. Alternatively, the program can be provided by being recorded in a recording medium such as a hard disk incorporated in the computer. Furthermore, the program can be provided by download through a network.

Note that the program according to the present disclosure may call a necessary module from program modules provided as a part of the operating system (OS) of the computer, at a predetermined sequence at predetermined timing, to execute processing. In this case, the program itself does not include the above-described module, and the processing is executed in cooperation with the OS. Such a program not including the module may also be included in the program according to the present disclosure.

The program according to the present disclosure may be provided by being incorporated in a part of the other program. Also in this case, the program itself does not include a module included in the above-described other program, and the processing is executed in cooperation with the other program. Such a program incorporated in the other program may also be included in the program according to the present disclosure. The provided program product is installed in a program storage unit such as a hard disk and is then executed. Note that the program product includes a program itself and a recording medium storing the program.

The embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 DL server
10, 10A, 10B gateway
11 CPU
12 RAM
13 storage unit
14 first in-vehicle communication unit (communication unit)
15 wireless communication unit
16, 16A, 16B in-vehicle communication line
17A, 17B power line
18 power supply relay
18A regular power supply
18B accessary power supply
19 second in-vehicle communication unit (communication unit)
30 ECU
31 CPU
32 RAM
33 storage unit
34 communication unit
35 start-up unit
51 CPU
52 ROM
53 RAM
54 storage unit
55 communication unit
111 update control unit (control unit)
112 path selection unit (selection unit)

The invention claimed is:

1. A control apparatus, comprising:
an in-vehicle communication device configured to communicate with an on-vehicle control device;
a memory configured to store a plurality of types of communication paths from the in-vehicle communication device to the on-vehicle control device; and
a processor configured to select a transmission path for transmitting an update program to the on-vehicle control device, among the plurality of types of communication paths, wherein:
the processor calculates an index value for each of the plurality of types of communication paths, and selects the transmission path based on a result of comparison of the calculated index values,
the index value includes electric energy consumed in transmission of the update program through the transmission path and a required time necessary for transmission of the update program through the transmission path, and
the processor selects the transmission path from the plurality of types of communication paths other than a communication path with a maximum required time among the plurality of types of communication paths in a case where a predetermined condition is satisfied, and selects the transmission path from the plurality of types of communication paths other than a communication path with a maximum electric energy consumed among the plurality of types of communication paths in a case where the predetermined condition is not satisfied.

2. The control apparatus according to claim 1, wherein the predetermined condition is that an urgency degree of update of a control program with use of the update program is high, the urgency degree being set to the update program.

3. The control apparatus according to claim 1, wherein the predetermined condition is that a battery supplying power to each of devices connected to the communication path is being charged.

4. The control apparatus according to claim 1, wherein
the plurality of types of communication paths includes a communication path of a different communication system,
the memory further stores a transmission rate of each of the plurality of types of communication paths, and
the processor calculates the required time from the transmission rate and a size of the update program.

5. The control apparatus according to claim 1, wherein
the memory further stores power consumption in communication through each of the plurality of types of communication paths per unit time, and the processor multiplies the power consumption by the required time to calculate the electric energy consumed.

6. A control method for controlling transmission of an update program to an on-vehicle control device by a control apparatus that communicates with the on-vehicle control device through an in-vehicle communication line,
the control apparatus including an in-vehicle communication device configured to communicate with the on-vehicle control device, and
a memory configured to store a plurality of types of communication paths from the in-vehicle communication device to the on-vehicle control device,
the control method comprising:
a step of selecting a transmission path for transmitting the update program to the on-vehicle control device, among the plurality of types of communication paths,
a step of calculating an index value for each of the plurality of types of communication paths, and selects the transmission path based on a result of comparison of the calculated index values,
the index value including electric energy consumed in transmission of the update program through the transmission path and a required time necessary for transmission of the update program through the transmission path, and
a step of selecting the transmission path from the plurality of types of communication paths other than a communication path with a maximum required time among the plurality of types of communication paths in a case where a predetermined condition is satisfied, and selecting the transmission path from the plurality of types of communication paths other than a communication path with a maximum electric energy consumed among the plurality of types of communication paths in a case where the predetermined condition is not satisfied.

7. A non-transitory computer readable storage medium storing a computer program for causing a computer to function as a processor within a control apparatus configured to communicate with an on-vehicle control device through an in-vehicle communication line, the computer including
an in-vehicle communication device configured to communicate with the on-vehicle control device and
a memory configured to store a plurality of types of communication paths from the in-vehicle communication device to the on-vehicle control device,
the computer program causing the computer to function as the processor configured to select a transmission path for transmitting an update program to the on-vehicle control device, among the plurality of types of communication paths, wherein:
the processor calculates an index value for each of the plurality of types of communication paths, and selects the transmission path based on a result of comparison of the calculated index values,
the index value includes electric energy consumed in transmission of the update program through the transmission path and a required time necessary for transmission of the update program through the transmission path, and
the processor selects the transmission path from the plurality of types of communication paths other than a communication path with a maximum required time among the plurality of types of communication paths in a case where a predetermined condition is satisfied, and selecting the transmission path from the plurality of types of communication paths other than a communication path with a maximum electric energy consumed among the plurality of types of communication paths in a case where the predetermined condition is not satisfied.

* * * * *